US012519201B2

(12) United States Patent
Cendamo et al.

(10) Patent No.: US 12,519,201 B2
(45) Date of Patent: Jan. 6, 2026

(54) BIAS TEES HAVING A CAPACITANCE TO GROUND

(71) Applicant: CommScope Italy S.r.l., Agrate Brianza (IT)

(72) Inventors: Matteo Cendamo, Sesto San Giovanni (IT); Marco Comerlati, Triuggio (IT)

(73) Assignee: CommScope Italy S.r.l., Agrate Brianza (IT)

( * ) Notice: Subject to any disclaimer, the term of this patent is extended or adjusted under 35 U.S.C. 154(b) by 251 days.

(21) Appl. No.: 18/257,163

(22) PCT Filed: Mar. 16, 2022

(86) PCT No.: PCT/EP2022/056852
§ 371 (c)(1),
(2) Date: Jun. 13, 2023

(87) PCT Pub. No.: WO2022/228769
PCT Pub. Date: Nov. 3, 2022

(65) Prior Publication Data

US 2024/0039138 A1 Feb. 1, 2024

(30) Foreign Application Priority Data

Apr. 30, 2021 (IT) ........................ 102021000011000

(51) Int. Cl.
*H01P 5/16* (2006.01)
*H01P 1/20* (2006.01)

(52) U.S. Cl.
CPC .................. *H01P 5/16* (2013.01); *H01P 1/20* (2013.01); *H01P 1/2007* (2013.01)

(58) Field of Classification Search
CPC ............. H01P 1/2007; H01P 1/20; H01P 5/16
USPC ........ 333/128, 161, 203–205, 238, 245, 246
See application file for complete search history.

(56) References Cited

U.S. PATENT DOCUMENTS 3,980,975 A 9/1976 Maxon et al.
5,712,607 A * 1/1998 Dittmer .................... H01P 3/087 333/246
6,229,408 B1 5/2001 Jovanovich et al.
2007/0052492 A1 3/2007 Duan et al.
2009/0009270 A1 * 1/2009 Rivas ....................... H01P 3/085 29/830
2022/0209406 A1 * 6/2022 Yang ..................... H04B 7/0617

OTHER PUBLICATIONS

Italian Search Report Corresponding to Italian Application No. 102021000011000 (Jan. 26, 2022).
Notification of Transmittal of the International Search Report and the Written Opinion of the International Searching Authority, or the Declaration, in corresponding PCT Application No. PCT/EP2022/056852 (Jul. 11, 2022).

* cited by examiner

*Primary Examiner* — Rakesh B Patel
(74) *Attorney, Agent, or Firm* — Myers Bigel, P.A.

(57) ABSTRACT

Bias tees are provided that include a radio frequency (RF) transmission line. The bias tees include a dielectric material that is configured to provide a capacitance between the RF transmission line and ground. The bias tees include a high-frequency port, a common port, and a low-frequency port, and the RF transmission line is coupled between the common port and the low-frequency port.

18 Claims, 15 Drawing Sheets

BIAS TEES HAVING A CAPACITANCE TO GROUND

CROSS-REFERENCE TO RELATED APPLICATION

The present application is a 35 U.S.C. § 371 national stage application of PCT Application No. PCT/EP2022/056852, filed Mar. 16, 2022, which claims priority to Italian Patent Application No. 102021000011000, filed Apr. 30, 2021, the entire contents of which are incorporated herein by reference. The above-referenced PCT Application was published in the English language as International Publication No. WO 2022/228769 A1 on Nov. 3, 2022.

FIELD

The present disclosure relates to communications systems and, in particular, to diplexers that are usable, for example, with radio frequency ("RF") filters.

BACKGROUND

Diplexers are three-port networks that are used to split incoming electrical signals input at a common port onto two frequency-selective ports, and to combine electrical signals received at the two frequency-selective ports (which are often referred to as a low-frequency port and a high-frequency port) and to output the combined signal through the common port. A bias tee is a type of diplexer where one of the frequency-selective ports is configured to pass direct current ("DC") and low frequency signals. A bias tee is often used to pass DC bias signals to an electronic component. The low-frequency port of the bias tee is used to pass the DC bias signals to the electronic component while blocking RF signals. The high-frequency port of the bias tee passes RF signals to the electronic component or another device while blocking the DC bias signals. Both the DC signals and the RF signals pass through the common port of the bias tee. Though the three ports of the bias tee may be arranged in the shape of a T, the term "bias tee," as used herein, is not limited to a T-shaped arrangement of ports.

Bias tees are widely used in cellular communication systems, as many cellular base stations include filters that are mounted within a base station antenna or on an antenna tower adjacent the base station antenna. To reduce the number of cables routed up the antenna tower, both a DC power signal and RF signals may be transmitted from base station equipment at the base of the antenna tower to the top of the antenna tower over a common cable. At the top of the tower, a bias tee may be used to separate the DC power signal from the RF signals. In some applications, the first electronic component at the top of the antenna tower that operates on the RF signal is a filter. In such application, a bias tee may be integrated into the RF filter so that the RF signals may be routed through the frequency-response portion of the filter and the DC signals may be separated from the RF signals and routed to other electronic components at the top of the antenna tower. The high-frequency port of the bias tee may include a DC block capacitor that is located between an RF connector of the RF filter and the first (and/or last) resonator of the RF filter. The low-frequency port of the bias tee may include an RF choke that passes DC power signals to, for example, an active electronic component, while blocking RF signals. As an example, an insulating tube having a metal rod therein can separate the DC component from a combined RF-and-DC signal and pass the DC component to the active electronic component via the metal rod.

SUMMARY

A bias tee, according to some embodiments, may include a low-frequency port, a high-frequency port, and a common port. The bias tee includes an RF transmission line that is coupled between the common port and the low-frequency port. Moreover, the bias tee includes a dielectric material that is configured to provide a capacitance between the RF transmission line and electrical ground.

In some embodiments, the RF transmission line may include a metallic stripline trace that is at least 1 millimeter thick.

According to some embodiments, the RF transmission line may include a widened portion. The RF transmission line may be coupled to an RF connector of an RF filter, and the dielectric material may be between the widened portion of the RF transmission line and a housing of the RF filter. Moreover, the bias tee may include a dielectric fastener that is on a first surface of the widened portion of the RF transmission line. The dielectric material may be on a second surface of the widened portion of the RF transmission line that is opposite the first surface. The widened portion of the RF transmission line may be on an upper surface of the housing, and the first and second surfaces of the widened portion of the RF transmission line may be perpendicular to a sidewall of the housing.

In some embodiments, the RF transmission line may have first and second narrowed portions that are inductively coupled to each other. The RF transmission line may include a widened portion that has opposed first and second ends from which the first and second narrowed portions, respectively, of the RF transmission line extend. Moreover, the first and second narrowed portions of the RF transmission line may include first and second coupling sections, respectively. The RF transmission line may include third and fourth coupling sections that are inductively coupled to each other and that extend from the first and second coupling sections, respectively.

According to some embodiments, the dielectric material may be part of a capacitor that is part of an inductor-capacitor (LC) resonant circuit provided along the RF transmission line. The LC resonant circuit may include a first LC resonant circuit, and the bias tee may include a second LC resonant circuit that is coupled in series with the first LC resonant circuit along the RF transmission line. Moreover, the second LC resonant circuit may include a first inductor, a capacitor that is coupled between the RF transmission line and electrical ground, and a second inductor. The first and second inductors may be configured to mutually couple with each other.

A bias tee, according to some embodiments, may have an air-stripline RF transmission line that is along a low-frequency path of the bias tee and is capacitively coupled to ground.

In some embodiments, the air-stripline RF transmission line may include first and second sections that are configured to inductively couple with each other.

According to some embodiments, the bias tee may include a dielectric sheet. The capacitive coupling to ground may be provided via the dielectric sheet. The dielectric sheet may be on a metal housing and is between the air-stripline RF transmission line and the metal housing. Moreover, the metal housing may be a metal housing of an RF filter, and the air-stripline RF transmission line may include first and second portions that are inductively coupled to each other and that extend in parallel with a sidewall of the metal housing of the RF filter.

A bias tee, according to some embodiments, may include a low-frequency port, a high-frequency port, and a common port. The bias tee may include a capacitance to ground that is coupled between the common port and the low-frequency port. Moreover, the bias tee may include first and second coupling sections that are coupled between the common port and the low-frequency port. The first and second coupling sections may have mutual coupling therebetween.

In some embodiments, the mutual coupling may include mutual inductance. Moreover, the first and second coupling sections may be first and second portions, respectively, of an RF transmission line of the bias tee.

According to some embodiments, the capacitance to ground may be coupled between the first and second coupling sections.

DETAILED DESCRIPTION

Figure 1A:
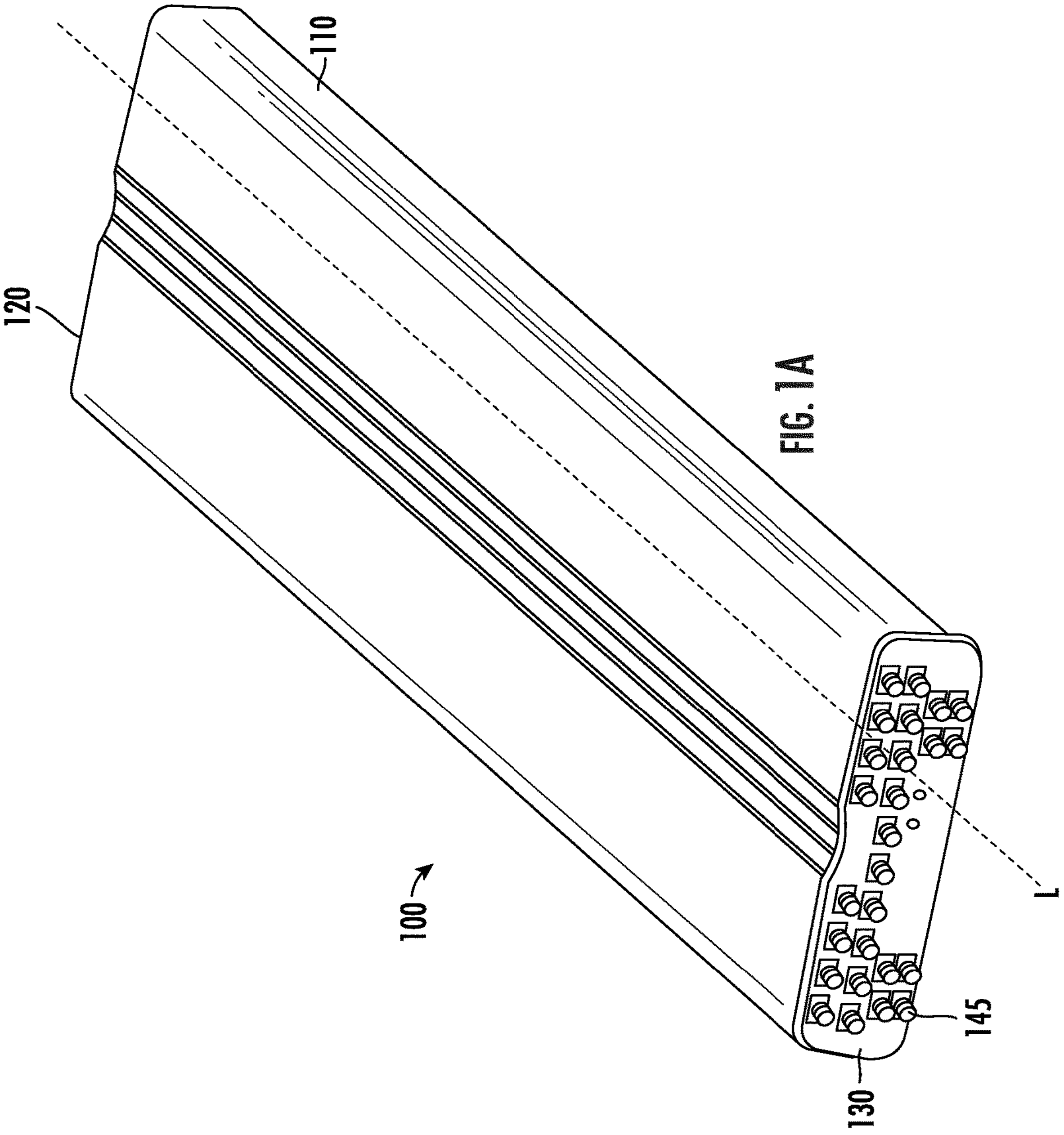
FIG. 1A is a front perspective view of a base station antenna in which bias tees according to embodiments of the present invention may be used.

Pursuant to embodiments of the present invention, bias tees are provided that include a high power inductor-capacitor (LC) circuit and a DC block capacitor. The high power LC circuit, which is coupled to the low-frequency port of the bias tee, may be formed as a stripline RF transmission line that is capacitively coupled to ground and a capacitor that may generate multiple transmission zeros. The location of transmission zeros may be selected to block RF signals in the operating frequency band of the RF filter. The DC block capacitor may be coupled to the high-frequency port of the bias tee to block DC signals from entering the RF filter. An example of a conventional high power bias tee is an insulating tube having a metal rod therein that serves as an RF choke that passes a DC component of a combined RF-and-DC signal.

Though conventional bias tees can separate a DC component from a combined RF-and-DC signal and can produce two transmission zeros, the RF bandwidth of conventional bias tees (i.e., the range of RF signals blocked by the low-frequency port of the bias tee) may be relatively narrow. For example, conventional bias tees may only block RF signals within a bandwidth of 1,927 megahertz ("MHz"), which may include frequencies above 800 MHz and below 2,800 MHz. Around 2,800 MHz, conventional bias tees may produce a resonance that makes the conventional bias tees unusable at this frequency due to the very small isolation produced. For example, a level of isolation having an absolute value smaller than 30 decibels ("dB") may preclude a bias tee from using frequencies corresponding to that level.

According to the present invention, however, a bias tee having an RF transmission line that is capacitively coupled to ground can provide a wider operating bandwidth (e.g., about 2,690 MHz) than conventional bias tees. As an example, the bias tees according to embodiments of the present invention may include a transmission zero around 3,000 MHz, and a level of isolation may have an absolute value of 30 dB or greater in the 800-3,500 MHz frequency range.

A bias tee according to the present invention may also be more customizable than conventional bias tees, as the bias tees according to embodiments of the present invention can be modified by adjusting the size/shape of an RF transmission line thereof, whereas modifying conventional bias tees may require use of an expensive metal manufacturing tool to produce a new RF choke. As an example, the RF transmission line may comprise a metallic stripline having adjustable length, width, and/or thickness dimensions. As another example, the metallic stripline may include coupling sections having an adjustable distance therebetween. In a further example, a dielectric film/sheet by which the metallic stripline is capacitively coupled to ground may have adjustable length, width, and/or thickness dimensions. By changing the dimension(s)/shape of the metallic stripline and/or the dimension(s) of the dielectric film/sheet, frequencies at which the transmission zeros occur can be changed. Accordingly, the bandwidth provided by a bias tee according to embodiments of the present invention can be both wider and more easily customized (e.g., to encompass either lower frequencies or higher frequencies) than that of conventional bias tees.

Example embodiments of the present invention will be described in greater detail with reference to the attached figures.

FIG. 1A is a front perspective view of a base station antenna 100 in which bias tees according to embodiments of the present invention may be used. As shown in FIG. 1A, the antenna 100 is an elongated structure and has a generally rectangular shape. The antenna 100 includes a radome 110. In some embodiments, the antenna 100 further includes a top end cap 120 and/or a bottom end cap 130. The bottom end cap 130 may include a plurality of RF connectors or "ports" 145 mounted therein. The RF ports 145 may be connected to ports of one or more radios via, for example, coaxial cable connections.

Figure 1B:
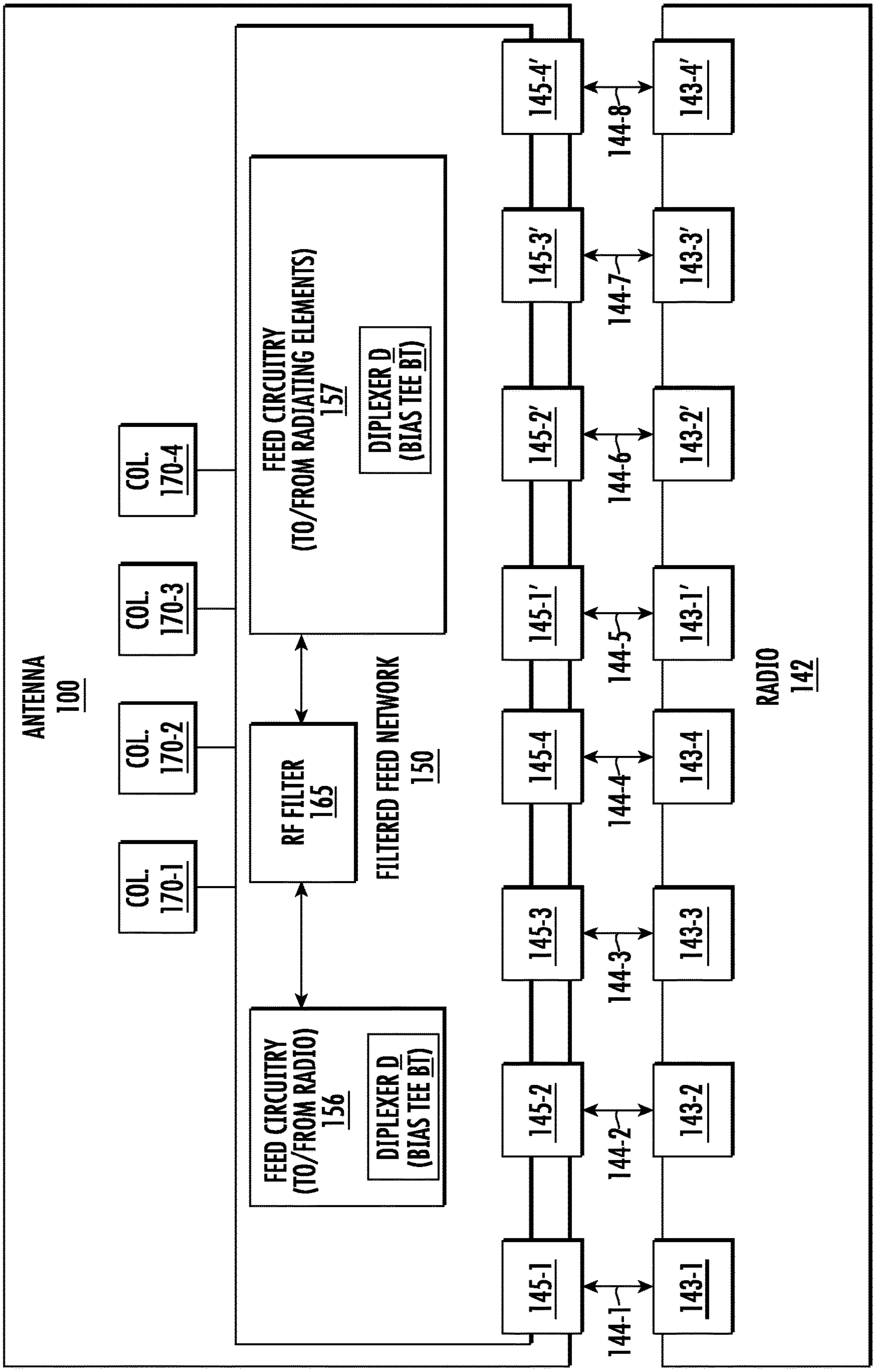
FIG. 1B is a schematic block diagram of ports of the base station antenna of FIG. 1A electrically connected to ports of a radio.

FIG. 1B is a schematic block diagram of ports 145 of the base station antenna 100 electrically connected to respective ports 143 of a radio 142. As shown in FIG. 1B, ports 145-1 through 145-4 of the antenna 100 are electrically connected to ports 143-1 through 143-4, respectively, of the radio 142 by respective RF transmission lines 144-1 through 144-4, such as coaxial cables. Similarly, ports 145-1' through 145-4' of the antenna 100 are electrically connected to ports 143-1' through 143-4', respectively, of the radio 142 by respective RF transmission lines 144-5 through 144-8. The ports 145-1 through 145-4 may transmit and/or receive RF signals in the same frequency band as the ports 145-1' through 145-4', or in a different frequency band from the ports 145-1' through 145-4'. For simplicity of illustration, only eight ports 145 are shown in FIG. 1B.

The antenna 100 may transmit and/or receive RF signals in one or more frequency bands, such as one or more bands comprising frequencies between 400 MHz and 5,800 MHz. The antenna 100 may include arrays (e.g., vertical columns) 170-1 through 170-4 of radiating elements 271 (FIG. 2) that are configured to transmit and/or receive RF signals. The antenna 100 may also include a filtered feed network 150 that is coupled between the arrays 170 and the radio 142. For example, the arrays 170 may be coupled to respective RF transmission paths (e.g., including one or more RF transmission lines) of the feed network 150.

In some embodiments, the feed network 150 may include one or more RF filters 165. Feed circuitry 156 of the feed network 150 may be coupled between each filter 165 and the radio 142. In other embodiments, the filter(s) 165 may be external to the antenna 100. As an example, a standalone unit that is coupled between the radio 142 and the antenna 100 may comprise the filter(s) 165.

The feed network 150 may also include feed circuitry 157 that is coupled between the filter(s) 165 and the arrays 170. The circuitry 156/157 can couple downlink RF signals from the radio 142 to radiating elements 271 that are in arrays 170. The circuitry 156/157 may also couple uplink RF signals from radiating elements 271 that are in arrays 170 to the radio 142. For example, the circuitry 156/157 may include power dividers, RF switches, RF couplers, and/or RF transmission lines that couple the filter device(s) 165 between the radio 142 and the arrays 170. Moreover, the circuitry 156 and the circuitry 157 may, in some embodiments, each include a bias tee BT. Though the bias tees BT are illustrated in FIG. 1B as being separate from the filter 165, the bias tees BT may, in some embodiments, share a housing 320 (FIG. 5B) with the filter 165.

The antenna 100 may include phase shifters that are used to electronically adjust the tilt angle of the antenna beams generated by each array 170. The phase shifters may be located at any appropriate location along the RF transmission paths that extend between the ports 145 and the arrays 170. Accordingly, though omitted from view in FIG. 1B for simplicity of illustration, the feed network 150 may include phase shifters.

Figure 2:
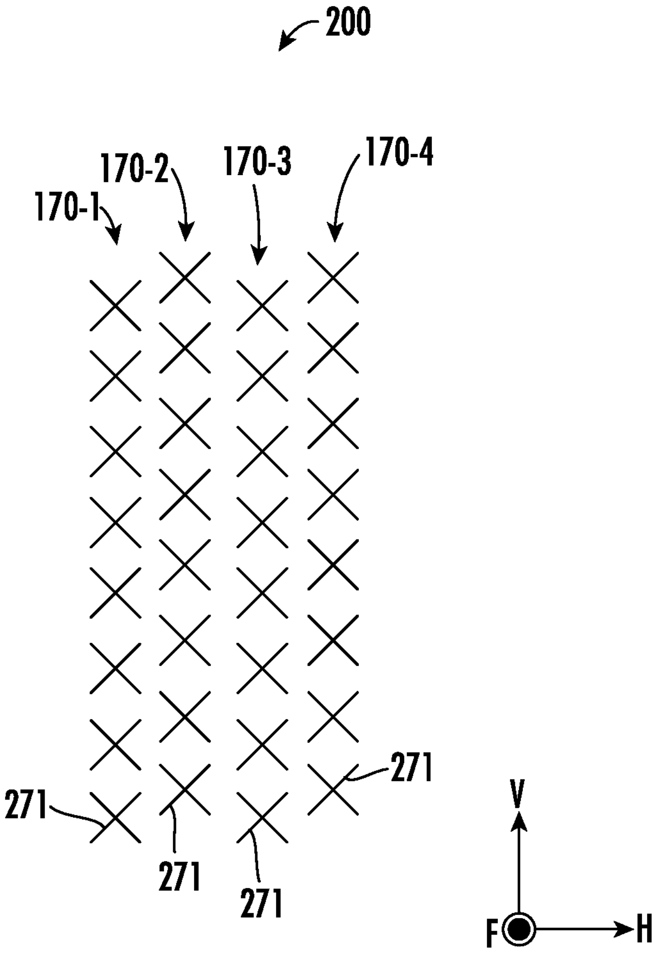
FIG. 2 is an example schematic front view of the base station antenna of FIG. 1A with the radome removed.

FIG. 2 is an example schematic front view of the base station antenna 100 of FIG. 1A with the radome 110 thereof removed to illustrate an antenna assembly of the antenna 100. The antenna assembly includes a plurality of radiating elements 271, which may be grouped into one or more arrays 170.

For example, FIG. 2 shows an antenna assembly 200 including four arrays 170-1 through 170-4 of radiating elements 271 in four vertical columns, respectively, that are spaced apart from each other in a horizontal direction H. The arrays 170 are each configured to transmit and receive RF signals in one or more frequency bands. Though FIG. 2 illustrates four arrays 170-1 through 170-4, the antenna assembly 200 may include more (e.g., five, six, or more) or fewer (e.g., three, two, or one) arrays 170. Moreover, the number of radiating elements 271 in an array 170 can be any quantity from two to twenty or more.

Figure 3A:
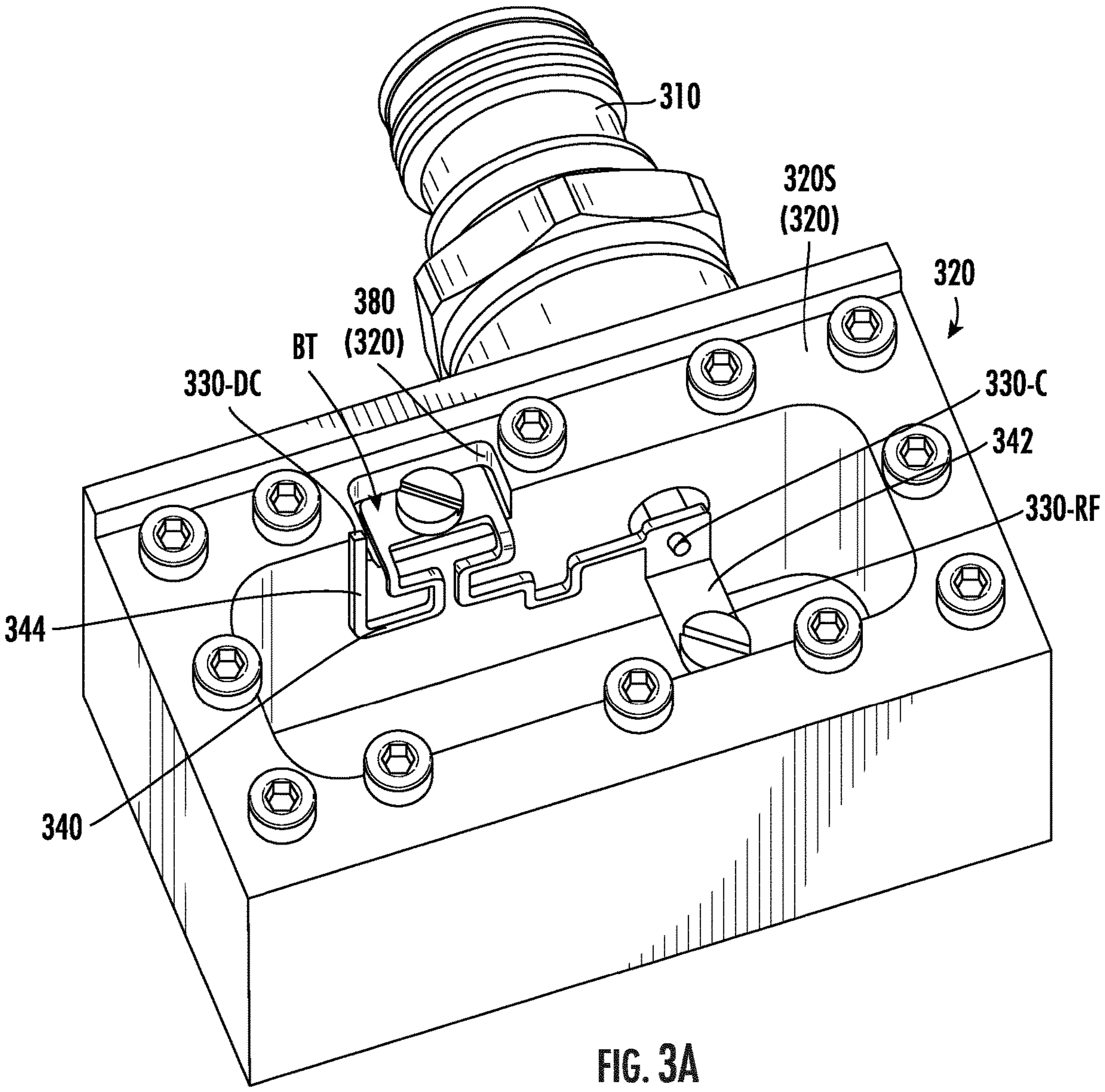
FIG. 3A is a top perspective view of a bias tee according to embodiments of the present invention.
Figure 5A:
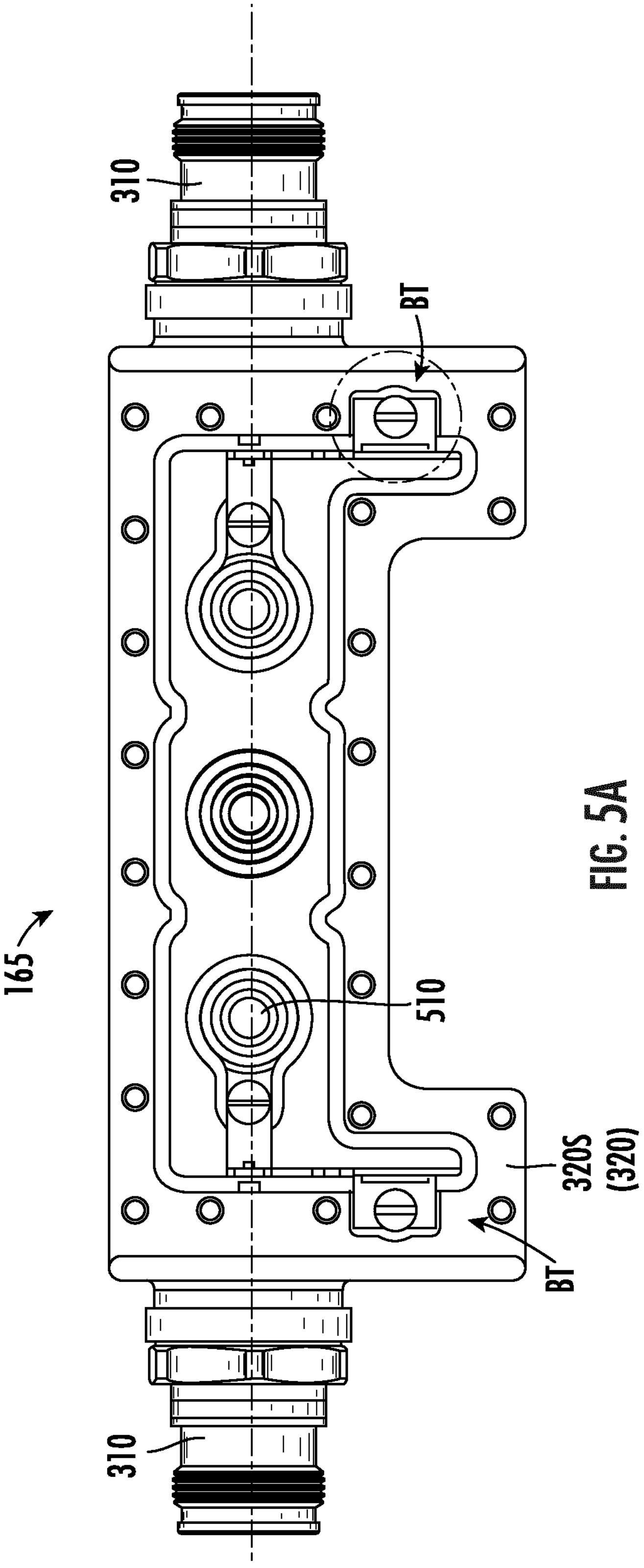
FIG. 5A is a top view of an RF filter having two bias tees coupled thereto, according to embodiments of the present invention.
Figure 5B:
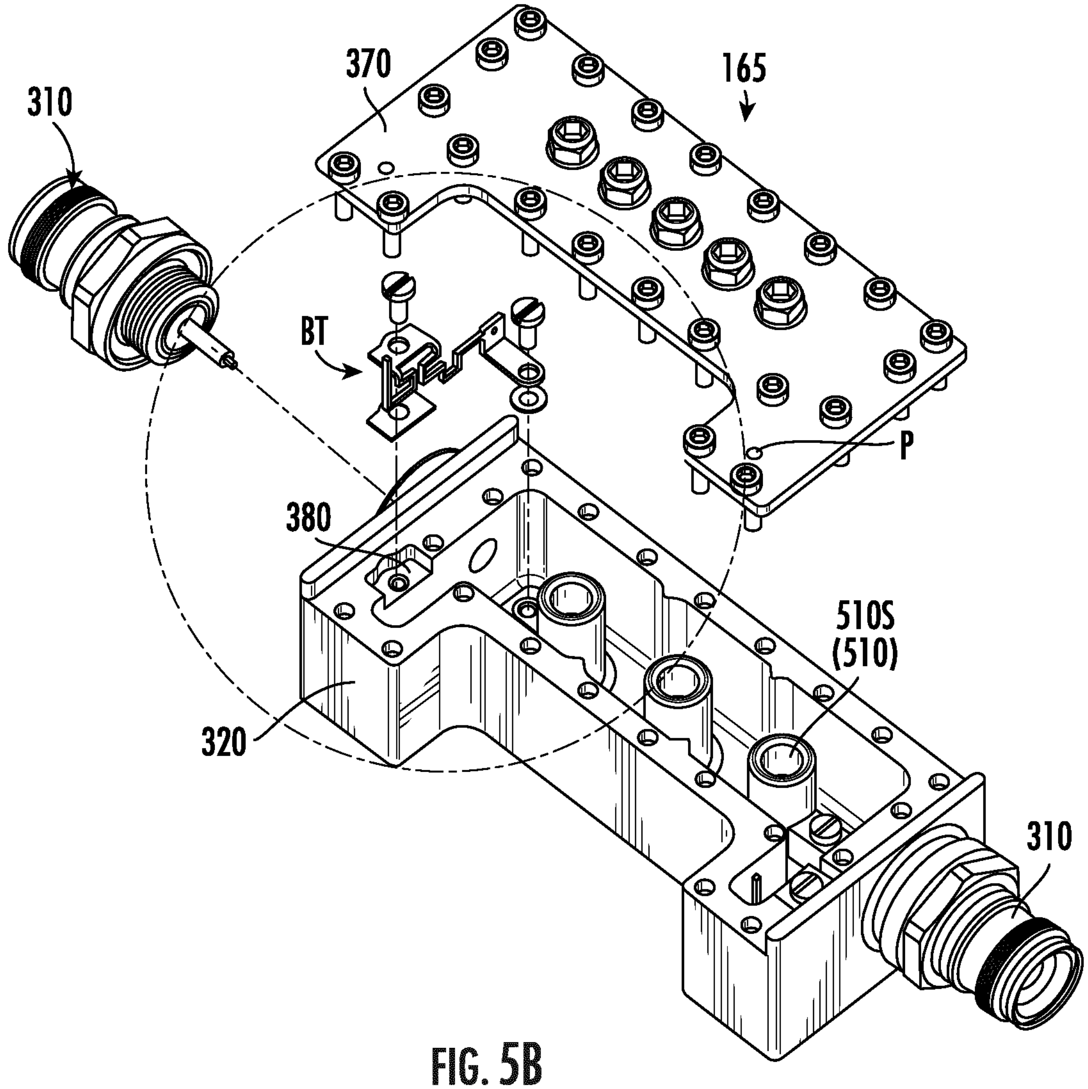
FIG. 5B is an exploded top perspective view of the RF filter of FIG. 5A.
Figure 5C:
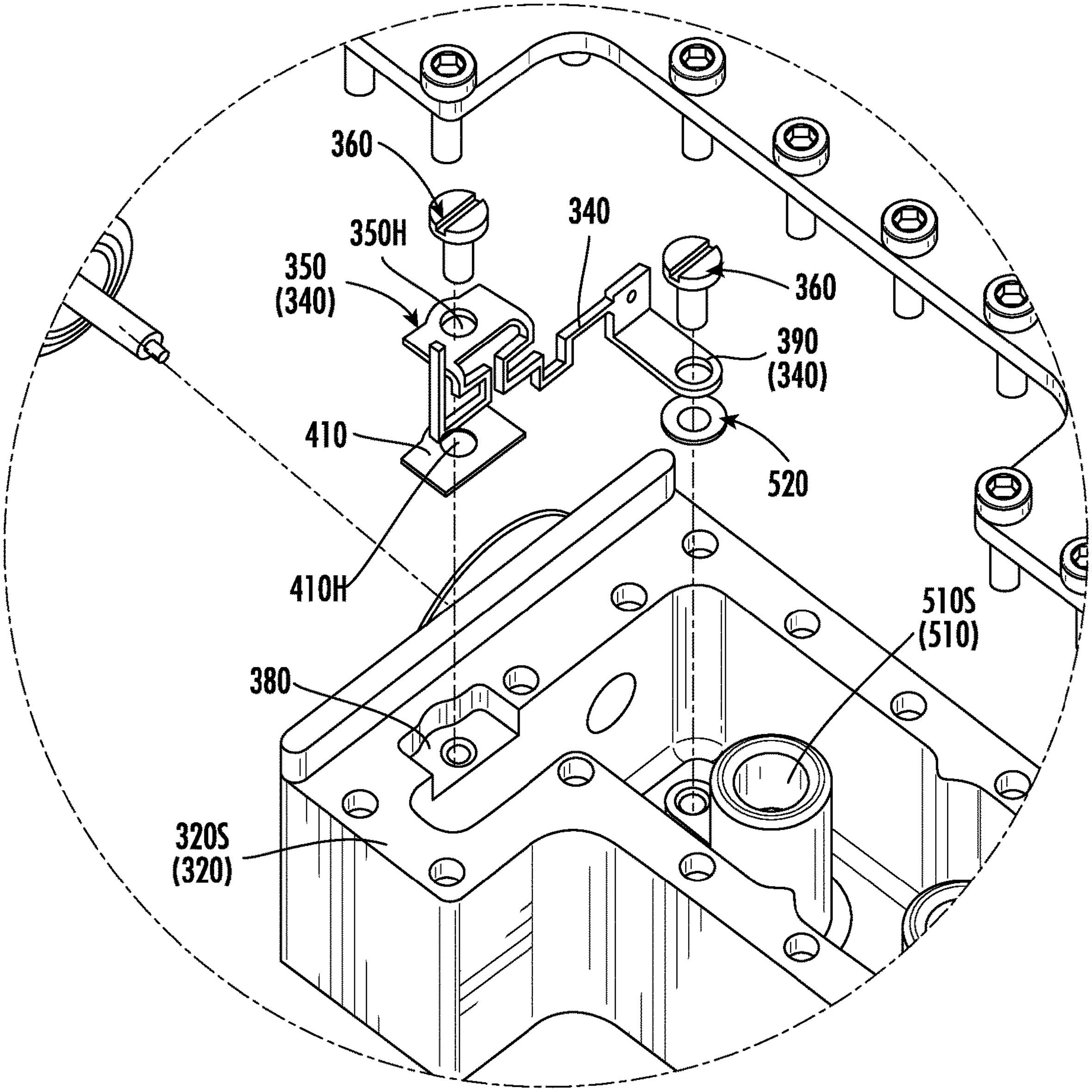
FIG. 5C is an enlarged view of a portion of FIG. 5B.

FIG. 3A is a top perspective view of a bias tee BT according to embodiments of the present invention. The bias tee BT of FIG. 3A is implemented as a standalone device. It will be appreciated that the bias tee BT may alternatively be implemented as part of another device such as, for example, an RF filter. FIGS. 5A-5C herein illustrate an RF filter having an integrated bias tee BT according to embodiments of the present invention.

Referring to FIG. 3A, the bias tee BT is a three-port device comprising (i) an RF port 330-RF (i.e., a high-frequency port), (ii) a DC port 330-DC (i.e., a low-frequency port), and (iii) a common port 330-C. Though the three ports of the bias tee BT may be generally arranged in a T shape or an L shape, these ports are not limited to having a T-shaped or L-shaped arrangement. The bias tee BT includes a housing 320.

A portion of the bias tee BT may be on the metal housing 320, such as in a recessed portion 380 of an upper surface 320S of the housing 320. In some embodiments, the housing 320 may be a housing of an RF filter 165 (FIG. 1B). For simplicity of illustration, a cover 370 (FIG. 3C) of the housing 320 is omitted from view in FIG. 3A. Moreover, the bias tee BT may include an RF transmission line 340 that is coupled between the DC port 330-DC and the RF port 330-RF, and is spaced apart from the housing 320.

The common port 330-C, which may also be referred to herein as a "combined" port because it may have a signal comprising both an RF component and a DC component, may be coupled to an RF connector 310 of the filter 165. Specifically, the common port 330-C may be coupled between the connector 310 and a resonator 510 (FIG. 5B) of the filter 165. The connector 310 may be, for example, an input connector or an output connector of the filter 165. As an example, the bias tee BT may be used to isolate resonators 510 of the filter 165 from a DC component of a combined RF-and-DC signal that is input via the connector 310.

Figure 3B:
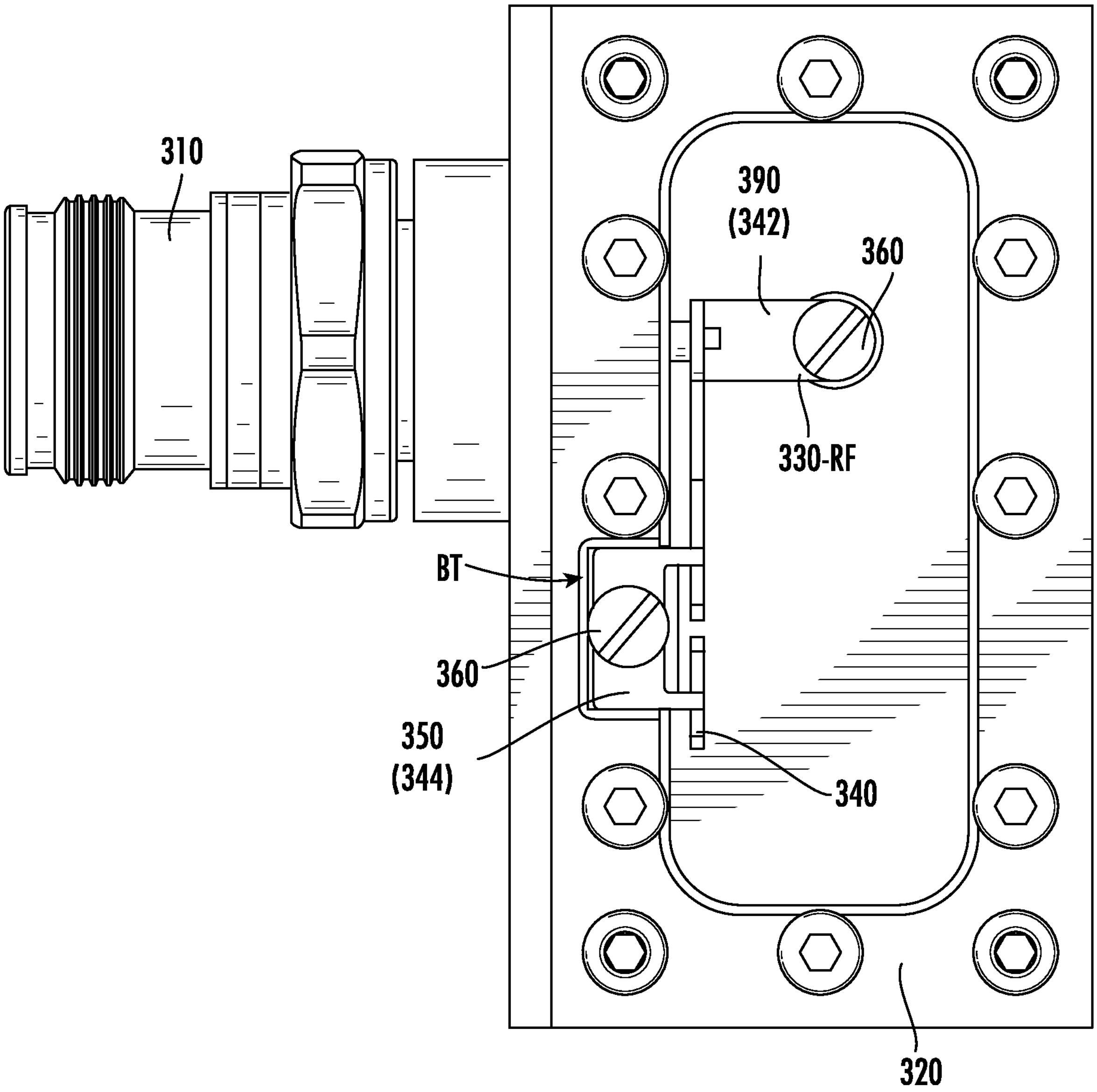
FIG. 3B is a top view of the bias tee of FIG. 3A.

FIG. 3B is a top view of the bias tee BT. For simplicity of illustration, the cover 370 (FIG. 3C) of the housing 320 is also omitted from view in FIG. 3B.

As shown in FIGS. 3A and 3B, the RF transmission line 340 may include a first portion 342 that extends from a center conductor of the connector 310 to the RF port 330-RF, and a second portion 344 that extends from the center conductor of the connector 310 to the DC port 330-DC. Each portion 342, 344 of the RF transmission line 340 may be implemented as a stripline transmission line. The stripline transmission line 340 may comprise a conductive material, which may be a metal such as copper.

The second portion 344 of the stripline transmission line 340 may include a widened portion 350 that is attached to the housing 320 by the first dielectric fastener 360, such as a dielectric screw. Narrow segments of the second portion 344 of the stripline transmission line 340 may be spaced apart from the housing 320 so as to comprise air stripline transmission line segments. As will be discussed in more detail herein, a strip of dielectric material may be interposed between the widened portion 350 of the second portion 344 of the stripline transmission line 340. The first portion 342 of the stripline transmission line 340 may comprise a widened air stripline segment 390. A second dielectric fastener 360 may attach the widened air stripline segment 390 to the housing 320. An RF signal may be provided to, or received from, a resonator 510 (FIG. 5B) of the filter 165 via the widened air stripline segment 390. Specifically, the RF signal may be communicated via the RF port 330-RF, which is included in the RF path 390.

Figure 3C:
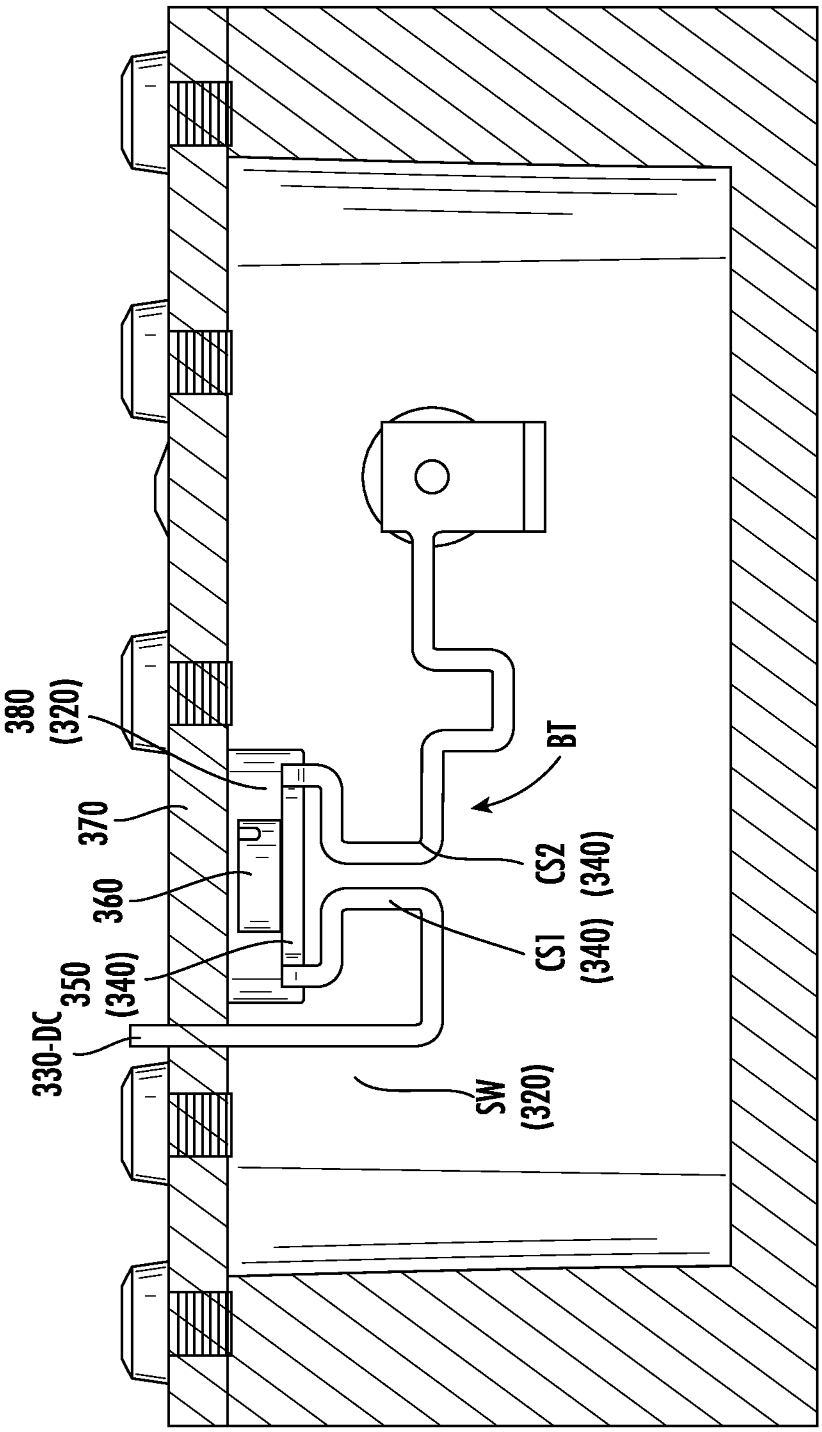
FIG. 3C is a cross-sectional view of the bias tee of FIG. 3A.

FIG. 3C is a cross-sectional view of the bias tee BT. As shown in FIG. 3C, the stripline transmission line 340 includes first and second coupling sections CS1, CS2 that extend alongside each other and have a space (e.g., air) therebetween. The coupling sections CS1, CS2 may be narrow sections of the second portion 344 (FIG. 3A) of the stripline transmission line 340 that are inductively coupled to each other. The stripline transmission line 340, including the coupling sections CS1, CS2 thereof, may be adjacent, and spaced apart by air from, a sidewall SW of the housing 320. The coupling sections CS1, CS2 may provide a wider rejected frequency band than a transmission line that lacks multiple coupling sections.

The widened portion 350 of the stripline transmission line 340 may be mounted in the recessed portion 380 of the upper surface 320S (FIG. 3A) of the housing 320. A cover 370 may extend over, and be fastened to, the housing 320, such as by a plurality of screws. The cover 370 may be, for example, a conductive cover, such as a tuning cover. Moreover, a portion of the stripline transmission line 340 that includes the DC port 330-DC may protrude upward beyond an upper surface of the cover 370. In some embodiments, a gas-discharge/surge-protection component may follow, and be coupled to, the DC port 330-DC. The gas-discharge/surge-protection component may be coupled to ground and may thereby provide protection against lightning strikes.

Figure 4A:
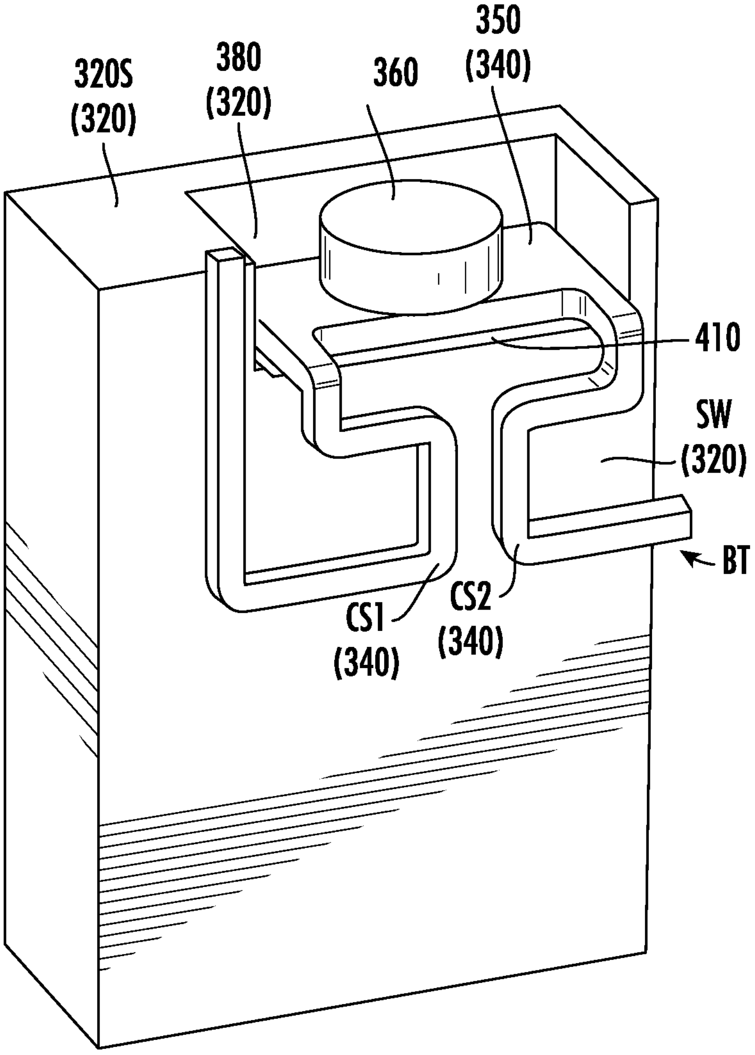
FIG. 4A is a side perspective view of a portion of the bias tee of FIG. 3A.

FIG. 4A is a side perspective view of a portion of the bias tee BT of FIG. 3A. As shown in FIG. 4A, the bias tee BT may include a dielectric material 410 that is configured to provide a capacitance between the widened portion 350 of the stripline transmission line 340 and electrical ground. The capacitance and electrical ground may be represented by, for example, a capacitor C2 and ground GND, respectively, of a circuit diagram of the bias tee BT that is discussed in more detail herein with reference to FIG. 8. The housing 320 may, for example, be coupled to the outer conductor of a coaxial cable that is attached to the common port 330-C to maintain the housing 320 at electrical ground. The dielectric material 410 may be between (a) the widened portion 350 of stripline transmission line 340 and (b) a lower surface of the recessed portion 380 of the upper surface 320S of the housing 320.

In some embodiments, the dielectric material 410 may be a polyimide film/sheet, such as a KAPTON® film/sheet, having a thickness of about 0.025 mm. In other embodiments, the dielectric material 410 may have a thickness between 0.01 mm and 0.024 mm or a thickness greater than 0.025 mm. The thickness of the dielectric material 410 may be associated with multiple transmission zeros of the bias tee BT, and thus can regulate an RF rejection level along the low-frequency path of the bias tee BT.

The stripline transmission line 340 may comprise a metallic stripline trace that is at least 1 mm thick. If the stripline transmission line 340 were instead less than 1 mm thick, the risk of burning (e.g., due to a lightning strike) would increase.

Figure 4B:
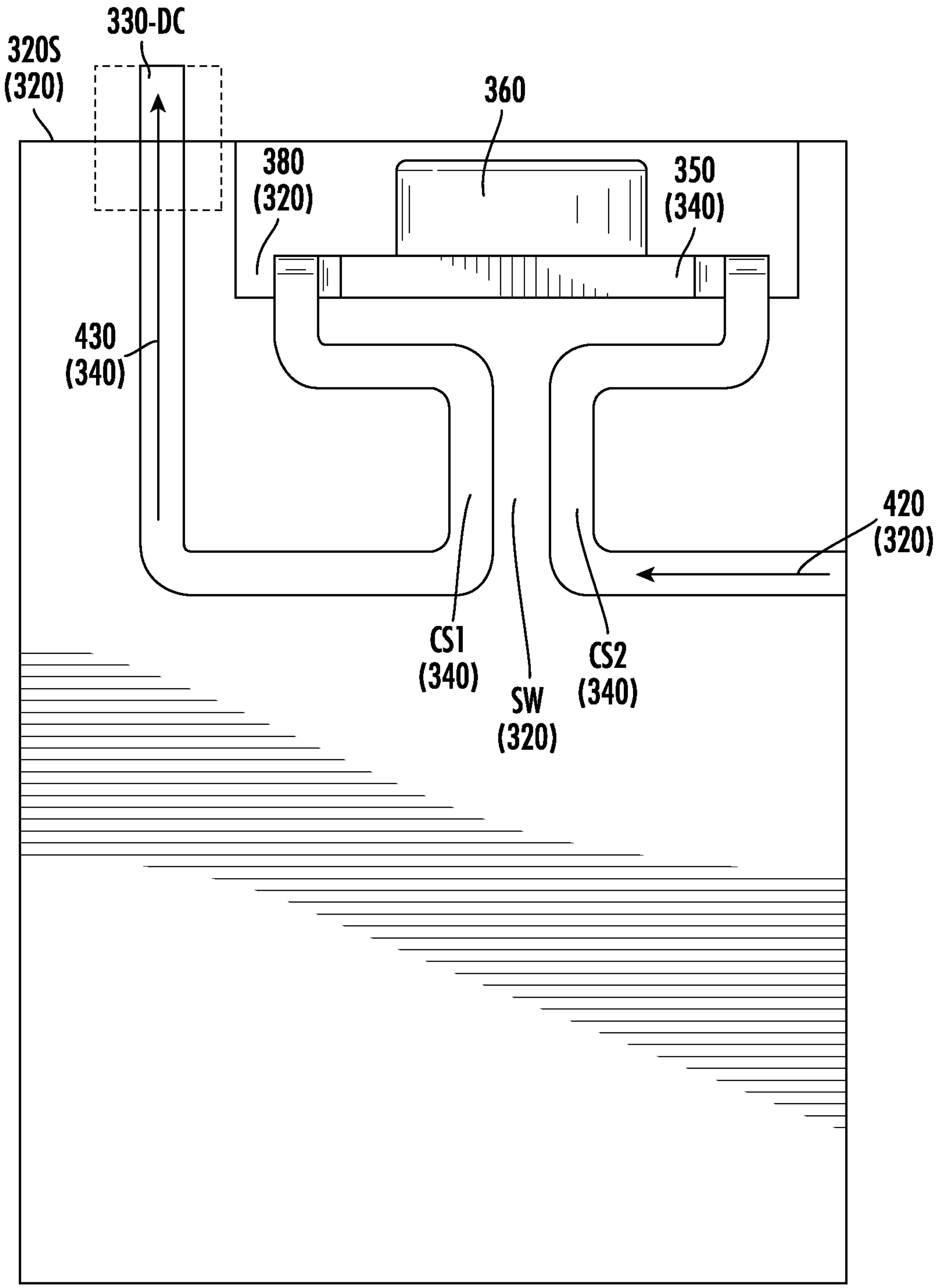
FIG. 4B is a side view of the portion of the bias tee of FIG. 3A.

FIG. 4B is a side view of the portion of the bias tee BT of FIG. 3A. As shown in FIG. 4B, the stripline transmission line 340 may include (i) a first path 420 that extends from the common port 330-C to the widened section 350 and (ii) a second path 430 that extends from the widened section 350 to the DC port 330-DC. A portion of the second path 430 that protrudes upward beyond the upper surface 320S of the housing 320 may include the DC port 330-DC.

Figure 4C:
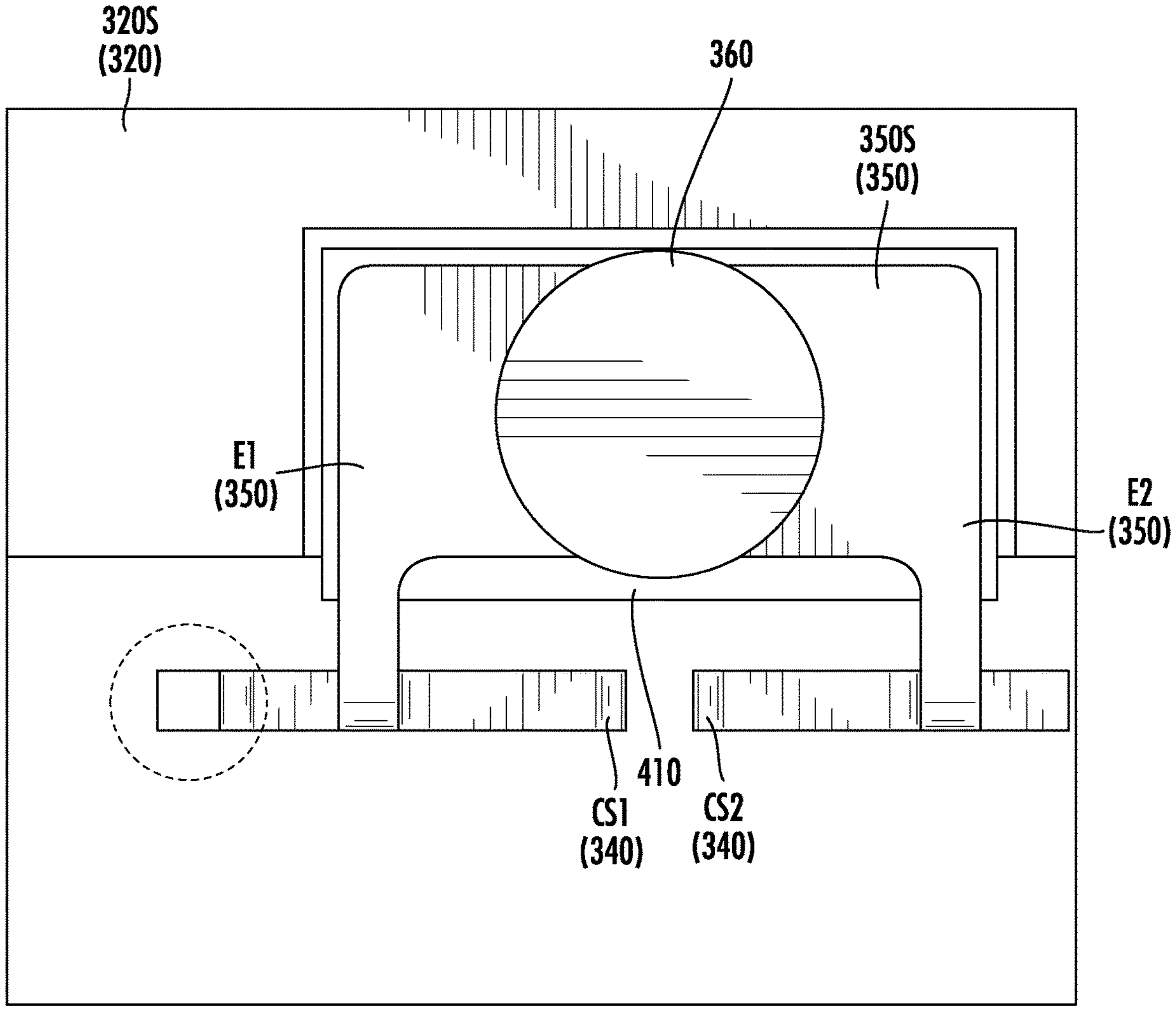
FIG. 4C is a top view of the portion of the bias tee of FIG. 3A.

FIG. 4C is a top view of the portion of the bias tee BT of FIG. 3A. As shown in FIG. 4C, a head of the dielectric fastener 360 may be on an upper surface 350S of the widened portion 350 of the stripline transmission line 340. The dielectric material 410 may be on a lower surface of the widened portion 350 of the stripline transmission line 340 that is opposite the upper surface 350S. The widened portion 350 of the stripline transmission line 340 and the dielectric material 410 may each include openings (not visible in FIG. 4C), and the shaft of the dielectric fastener 360 (also not visible in FIG. 4C) may extend through these openings into a threaded opening in the housing 320. The upper surface 350S and the lower surface may be perpendicular to a sidewall SW (FIG. 4B) of the housing 320. In some embodiments, the dielectric material 410 may extend laterally beyond a boundary of the widened portion 350 of the stripline transmission line 340. For example, the dielectric material 410 may laterally protrude from underneath the widened portion 350 toward the stripline transmission line 340.

First and second narrow portions of the stripline transmission line 340 including the respective coupling sections CS1, CS2 may extend from opposite ends E1, E2, respectively, of the widened portion 350 of the stripline transmission line 340. The coupling sections CS1, CS2 may be spaced apart from the sidewall SW.

FIG. 5A is a top view of an RF filter 165 having two integrated bias tees BT according to embodiments of the present invention. For simplicity of illustration, a cover 370 (FIG. 5B) of the housing 320 of the filter 165 is omitted from view in FIG. 5A.

Each bias tee BT of FIG. 5A may have the design of the bias tee BT shown in FIGS. 3A-4C. In some embodiments, each of the bias tees BT may be coupled between a respective RF connector 310 of the filter 165 and a respective resonator 510 of the filter 165. For example, one of the bias tees BT may be coupled between an input connector 310 and a first resonator 510, and the other one of the bias tees BT may be coupled between an output connector 310 and a last resonator 510. Though three resonators 510 are shown in FIG. 5A, the filter 165 may, in some embodiments, instead include more or fewer resonators 510.

FIG. 5B is an exploded top perspective view of the RF filter 165 of FIG. 5A. As shown in FIG. 5B, each resonator 510 of the filter 165 may include a respective resonator stalk 510S. Though the filter 165 is illustrated in FIG. 5B as a coaxial cavity RF filter, the filter 165 may, in some embodiments, be another type of RF filter. For simplicity of illustration, resonator heads of the resonators 510 are omitted from view in FIG. 5B.

FIG. 5C is an enlarged view of a portion P of FIG. 5B. As shown in FIGS. and 5C, the bias tee BT includes a dielectric material 410 in a recessed portion 380 of an upper surface 320S of a housing 320 of the filter 165. The dielectric material 410 is between (a) a lower surface of the recessed portion 380 and (b) a lower surface of the widened portion 350 of the stripline transmission line 340. The dielectric material 410 and the widened portion 350 of the stripline transmission line 340 may include openings 410H and 350H, respectively, therein that the dielectric fastener 360 can extend through to attach the dielectric material 410 and the widened portion 350 to the recessed portion 380 of the housing 320.

A further dielectric fastener 360 may extend through (i) the widened air stripline segment 390 and (ii) a dielectric washer 520, to attach the widened air stripline segment 390 to the housing 320. In some embodiments, the dielectric washer 520 and each dielectric fastener 360 may comprise polyether ether ketone ("PEEK"). The dielectric washer 520 can provide a capacitance (e.g., represented by a capacitor C1 (FIG. 8)) that blocks a DC component of a combined RF-and-DC signal.

Figure 6:
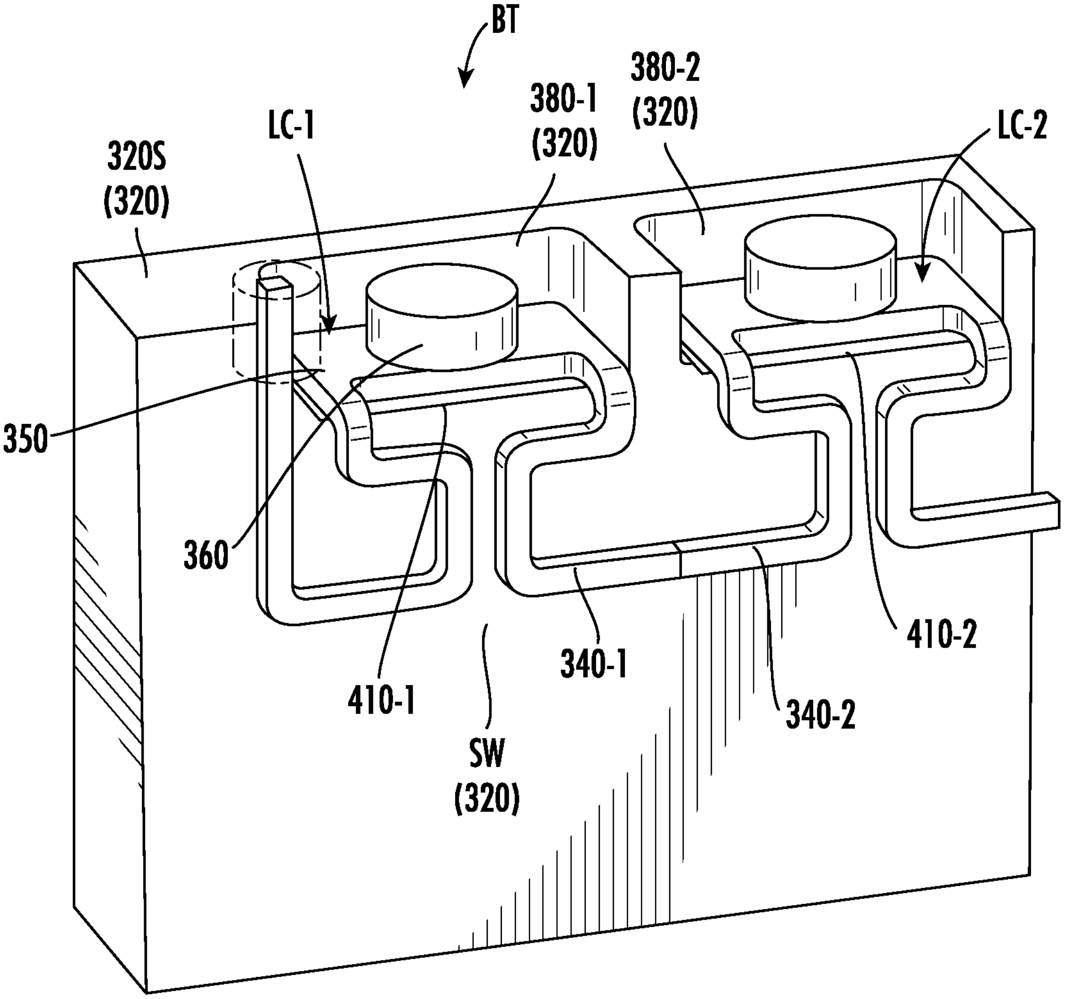
FIG. 6 is a side perspective view of two inductor-capacitor circuits of a bias tee that are coupled in series, according to other embodiments of the present invention.

FIG. 6 is a side perspective view of two LC circuits LC-1, LC-2 that are coupled in series along the low-frequency path of the bias tee BT, according to embodiments of the present invention. The LC circuits LC-1, LC-2 may be attached to respective recessed portions 380-1, 380-2 of an upper surface 320S of a housing 320 (e.g., of an RF filter 165 (FIG. 1B)). Respective stripline transmission lines 340-1, 340-2 of the LC circuits LC-1, LC-2 may be capacitively coupled to electrical ground via respective dielectric films/sheets 410-1, 410-2. The stripline transmission lines 340-1, 340-2 may each be adjacent, and spaced apart from, the same sidewall SW of the housing 320. Moreover, the stripline transmission lines 340-1, 340-2 may comprise respective metallic stripline traces that are physically and electrically connected to each other.

By coupling the LC circuits LC-1, LC-2 in series via the stripline transmission lines 340-1, 340-2, the LC circuits LC-1, LC-2 may exhibit a wider rejection bandwidth along the low-frequency path than a single LC circuit. For example, the LC circuits LC-1, LC-2 may be able to reject RF signals at lower frequencies (e.g., a frequency band comprising 400 MHz and/or 500 MHz) than a single LC circuit. Moreover, the LC circuits LC-1, LC-2 may provide more transmission zeros than a single LC circuit. As an example, the LC circuits LC-1, LC-2 may collectively provide three or more transmission zeros.

Figure 7:
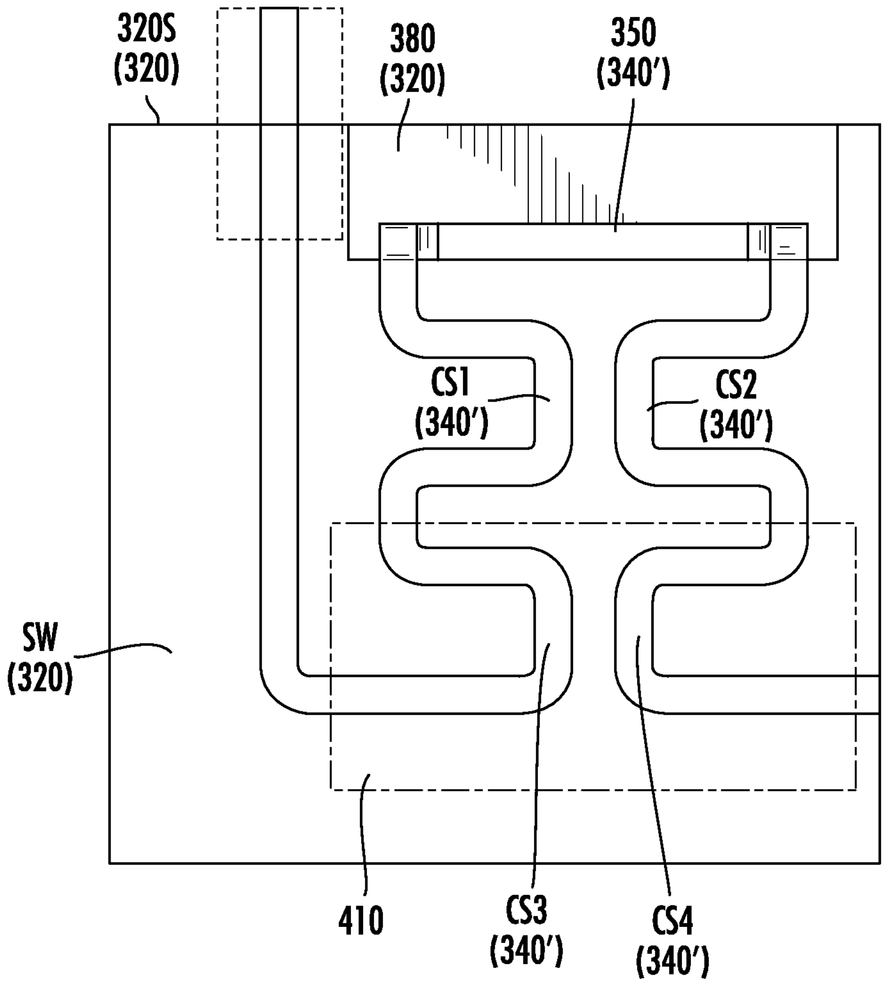
FIG. 7 is a side view of an RF transmission line that includes four coupling sections, according to further embodiments of the present invention.

FIG. 7 is a side view of a stripline transmission line 340' that includes four coupling sections CS1-CS4, according to embodiments of the present invention. Accordingly, third and fourth coupling sections CS3, CS4 may be inductively coupled to each other, in addition to the first and second coupling sections CS1, CS2 that are inductively coupled to each other. Thus, it will be appreciated that bias tees BT according to embodiments of the present invention are not limited to having stripline transmission lines 340 having only two coupling sections CS1, CS2.

Moreover, in some embodiments, a strip of dielectric material 410 may be positioned between the coupling sections CS3, CS4 and a sidewall SW of a housing 320 in place of and/or in addition to an air dielectric material. For example, the dielectric material 410 may be a very thin (e.g., 0.01 mm thick) dielectric film/sheet. A further dielectric film/sheet (e.g., the dielectric material 410 shown in FIG. 4A) and/or a dielectric fastener 360 (FIG. 4A) may, in some embodiments, not be present on a widened portion 350 of the stripline transmission line 340' that is in a recessed portion 380 of the housing 320.

Figure 8:
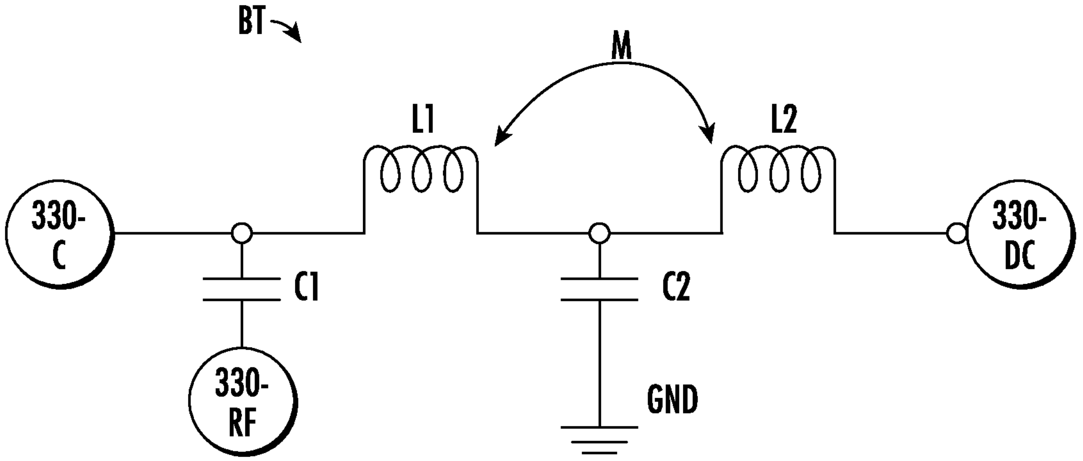
FIG. 8 is a circuit diagram of the bias tee of FIG. 3A.

FIG. 8 is a circuit diagram of the bias tee BT of FIG. 3A. The narrow sections of the stripline transmission line 340 along the low-frequency path that are on either side of the widened portion 350 (FIG. 3B) may act as a pair of inductors L1, L2. The coupling sections CS1, CS2 (FIG. 3C) of the narrow sections of the stripline transmission line 340 (FIG. 3A) may generate a mutual inductance M between the inductors L1, L2. The mutual inductance M may result in a wider rejected frequency band along the low-frequency path of the bias tee BT. In other embodiments, however, the stripline transmission line 340 may not have any mutual inductance M between different portions thereof.

The dielectric material 410 (FIG. 4A) provided between the widened section 350 of stripline transmission line 340 and the housing 320 may function as a capacitor C2 to ground GND. A further capacitor C1 may block a DC component of a combined RF-and-DC signal. The capacitor C2 is coupled between the common port 330-C and the DC port 330-DC of the bias tee BT. Specifically, in some embodiments, as shown in FIG. 8, the capacitor C2 may be coupled between the inductors L1, L2. In other embodiments, however, the capacitor C2 may be coupled between the inductor L1 and the capacitor C1 or between the inductor L2 and the DC port 330-DC. The inductors L1, L2, like the capacitor C2, are coupled between the common port 330-C and the DC port 330-DC. The inductors L1, L2 the capacitor C2, and the mutual inductance M may form an LC circuit that blocks an RF component of a combined RF-and-DC signal.

Bias tees BT (FIG. 3A) according to embodiments of the present invention may provide a number of advantages. These advantages include a wider RF blocking bandwidth along the low-frequency path than conventional bias tees. The advantages further include a simpler design that is more customizable than that of conventional bias tees. For example, customizing a bias tee BT according to embodiments of the present invention may include (i) changing the length, width, and/or thickness of the stripline transmission line 340 (FIG. 3A), (ii) changing the amount of coupling between two coupling sections CS1, CS2 (FIG. 3C) of the stripline transmission line 340, and/or (iii) changing the length, width, thickness, and/or dielectric constant of a dielectric material 410 (FIG. 4A) that capacitively couples the stripline transmission line 340 to ground. As a result, positions of transmission zeros of the bias tee BT may be relatively easily customized (e.g., to encompass either higher or lower frequencies). By contrast, customization of conventional bias tees may require an expensive metal manufacturing tool.

Though the bias tee BT is described herein as being usable with RF filters (e.g., an RF filter device 165 (FIG. 5B)), it is not limited thereto. Rather, bias tees BT according to embodiments of the present invention may be usable with systems/devices other than RF filters. For example, the bias tees BT may be used in non-filter multiplexing applications. It will also be appreciated the transmission line 340 may be implemented using transmission line technologies other than stripline transmission lines in some embodiments.

The present invention has been described above with reference to the accompanying drawings. The present invention is not limited to the illustrated embodiments. Rather, these embodiments are intended to fully and completely disclose the present invention to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," "coupled," and the like can mean either direct or indirect attachment or coupling between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

That which is claimed is:

1. A bias tee comprising:

a low-frequency port;

a high-frequency port;

a common port;

a radio frequency, RF, transmission line that is coupled between the common port and the low-frequency port; and a dielectric material that is configured to provide a capacitance between the RF transmission line and electrical ground, wherein the RF transmission line includes a widened portion, wherein the dielectric material is between the widened portion of the RF transmission line and the electrical ground, and wherein the RF transmission line comprises first and second narrowed portions that are inductively coupled to each other.

2. The bias tee of claim 1, wherein the RF transmission line comprises a metallic stripline trace that is at least 1 millimeter thick.

3. The bias tee of claim 1, wherein the RF transmission line is coupled to an RF connector of an RF filter, and wherein the dielectric material is between the widened portion of the RF transmission line and a housing of the RF filter.

4. The bias tee of claim 3, further comprising a dielectric fastener that is on a first surface of the widened portion of the RF transmission line, wherein the dielectric material is on a second surface of the widened portion of the RF transmission line that is opposite the first surface.

5. The bias tee of claim 3, wherein the widened portion of the RF transmission line is on an upper surface of the housing, and wherein the first and second surfaces of the widened portion of the RF transmission line are perpendicular to a sidewall of the housing.

6. The bias tee of claim 1, wherein the first and second narrowed portions of the RF transmission line comprise first and second coupling sections, respectively, and wherein the RF transmission line further comprises third and fourth coupling sections that are inductively coupled to each other and that extend from the first and second coupling sections, respectively.

7. The bias tee of claim 1, wherein the widened portion of the RF transmission line has opposed first and second ends from which the first and second narrowed portions, respectively, of the RF transmission line extend.

8. The bias tee of claim 1, wherein the dielectric material is part of a capacitor that is part of an inductor-capacitor, LC, resonant circuit provided along the RF transmission line.

9. The bias tee of claim 8, wherein the LC resonant circuit comprises a first LC resonant circuit, the bias tee further comprising a second LC resonant circuit that is coupled in series with the first LC resonant circuit along the RF transmission line.

10. The bias tee of claim 9, wherein the second LC resonant circuit comprises a first inductor, a capacitor that is coupled between the RF transmission line and electrical ground, and a second inductor, wherein the first and second inductors are configured to mutually couple with each other.

11. A bias tee having an air-stripline radio frequency, RF, transmission line that is along a low-frequency path of the bias tee and is capacitively coupled to ground, wherein the bias tee further comprises a dielectric, and wherein the capacitive coupling to ground is provided via the dielectric.

12. The bias tee of claim 11, wherein the air-stripline RF transmission line includes first and second sections that are configured to inductively couple with each other.

13. The bias tee of claim 11, wherein the dielectric is on a metal housing and is between the air-stripline RF transmission line and the metal housing.

14. The bias tee of claim 13, wherein the metal housing comprises a metal housing of an RF filter, and wherein the air-stripline RF transmission line comprises first and second portions that are inductively coupled to each other and that extend in parallel with a sidewall of the metal housing of the RF filter.

15. A bias tee comprising:

a low-frequency port;

a high-frequency port;

a common port;

a capacitance to ground that is coupled between the common port and the low-frequency port; and first and second coupling sections that are coupled between the common port and the low-frequency port, wherein the first and second coupling sections have mutual coupling therebetween.

16. The bias tee of claim 15, wherein the mutual coupling comprises mutual inductance.

17. The bias tee of claim 15, wherein the first and second coupling sections comprise first and second portions, respectively, of an RF transmission line of the bias tee.

18. The bias tee of claim 15, wherein the capacitance to ground is coupled between the first and second coupling sections.

* * * * *